United States Patent
Bruil et al.

[11] Patent Number: 6,130,687
[45] Date of Patent: Oct. 10, 2000

[54] HOT-MELT INK-JET PRINTHEAD

[75] Inventors: Anton Bruil, Venlo; Wilhelmus Antonius Maria Schreurs, Tegelen, both of Netherlands

[73] Assignee: Océ-Technologies B.V., Venlo, Netherlands

[21] Appl. No.: 08/916,259

[22] Filed: Aug. 22, 1997

[30] Foreign Application Priority Data

Aug. 22, 1996 [EP] European Pat. Off. ............. 96202321

[51] Int. Cl.[7] ............................ B41J 2/135; B41J 2/175; G01D 11/00
[52] U.S. Cl. .................................. 347/45; 88/99
[58] Field of Search .................... 347/45, 47, 88, 347/99

[56] References Cited

U.S. PATENT DOCUMENTS

| | | | |
|---|---|---|---|
| 4,296,421 | 10/1981 | Hara et al. | 347/48 |
| 4,623,906 | 11/1986 | Chandrashekhar | 347/47 |
| 4,779,099 | 10/1988 | Lewis | 347/70 |
| 4,820,346 | 4/1989 | Nowak | 106/22 |
| 5,212,496 | 5/1993 | Badesha et al. | 347/47 |
| 5,378,504 | 1/1995 | Bayard et al. | 427/377 |
| 5,387,440 | 2/1995 | Takemoto et al. | 427/443.1 |
| 5,563,640 | 10/1996 | Suzuki | 347/45 |
| 5,650,805 | 7/1997 | Shimomura et al. | 347/20 |

FOREIGN PATENT DOCUMENTS

| | | |
|---|---|---|
| 359365 | 3/1990 | European Pat. Off. . |
| 367438 | 5/1990 | European Pat. Off. . |
| 404493 | 12/1990 | European Pat. Off. . |
| 477555 | 4/1992 | European Pat. Off. . |
| 479493 | 4/1992 | European Pat. Off. . |
| 568249 | 11/1993 | European Pat. Off. . |

*Primary Examiner*—John Barlow
*Assistant Examiner*—Juanita Stephens

[57] ABSTRACT

An ink-jet printhead adapted for printing with hot-melt ink and having a nozzle face provided with an anti-wetting coating, wherein the anti-wetting coating contains silicone and/or polysilane as main component(s) and has a wetting angle of at least 40° and shows a decrease of the wetting angle of not more than 5% per 100 days of exposure in hot-melt ink.

11 Claims, 2 Drawing Sheets

HOT-MELT INK-JET PRINTHEAD

FIELD OF THE INVENTION

The invention relates to an ink-jet printhead, a method of manufacturing the same and a printing system employing such a printhead.

BACKGROUND OF THE INVENTION

Ink-jet printing systems can generally be divided into those employing a liquid ink, i.e. a water-based or solvent-based ink which is in the liquid state at room temperature, and those employing a so-called hot-melt ink which has its melting point above room temperature, e.g. at 100° C. or more. In both systems, the printhead typically has a flat nozzle face in which a number of orifices are formed through which ink droplets are expelled onto the printing medium either with a constant frequency or "on demand". The printhead further includes pressurizing means for generating the ink droplets by abruptly increasing the pressure of a volume of ink liquid which is contained in a nozzle channel associated with each of the nozzle orifices. In case of a hot-melt system, the printhead additionally includes heating means for keeping the temperature of the ink above its melting point, as long as the printhead is operative.

It is generally known in the art that the directional stability of the ink droplets expelled from the nozzle orifices may be adversely influenced when the surface of the nozzle face around the nozzle orifice is wetted with ink. Such a wetting of the nozzle face also has the drawback that dust particles may be absorbed by the ink at the nozzle face and may be drawn back into the ink channel so that they cause clogging of the nozzle orifice. A well-known remedy to these problems, at least in conjunction with water-based ink systems, is to coat the nozzle face of the printhead with an anti-wetting coating. In relation to a given ink liquid, the coating material should have an adhesive force which is small in comparison to the cohesive force (surface tension) of the liquid. In other words, the wetting angle or angle of contact between the coating and the ink liquid should be comparatively large, preferably on the order of 70° or more. As result, the ink liquid is "repelled" by the coating of the nozzle face, so that an undesired wetting of the nozzle face is avoided.

In conjunction with liquid ink systems, in particular water-based inks, a large number of suitable anti-wetting coating materials are known. For example, U.S. Pat. No. 4,296,421 proposes polyurethane, epoxide resin, phenoxy resin, phenolic resin, and also—among many others—silicone resin as a suitable material for an anti-wetting coating of an ink-jet printhead.

Coating materials which are effective for aqueous inks, however, are not obviously suited for solvent based inks and, in particular, for hot-melt inks. Compared to aqueous inks, hot-melt inks have considerably lower surface tensions. Accordingly, the coating materials should also have a low surface tension, i.e., a large wetting angle. In view of the elevated temperatures under which the hot-melt inks are used, it is further required that the coating materials do not swell or degrade in hot organic solvents. Further, since the hot-melt inks are typically used in printheads in which the ink is pressurized by means of piezoelectric actuators (ceramics), the curing temperature of the coating resin should be low in order to avoid depolarization of the piezoelectric material.

Ordinary organic materials are known to have a poor chemical resistance against hot organic solvents such as hot-melt inks. For example, many silicone-based elastomers and resins will generally swell and may eventually degrade when exposed to such hot-melt inks at elevated temperatures. Among the commonly used coating materials with low surface tension, only fluorinated polymers are typically resistant against organic solvents.

For these reasons, in conjunction with printheads adapted for printing with hot-melt inks, fluorinated inks have been proposed as anti-wetting coatings. For example, EP-A-0 359 365 discloses a printhead that is adapted for printing with hot melt ink in which the nozzle face is provided with an anti-wetting coating of polytetrafluorethylene (PTFE) or similar materials.

However, several drawbacks are associated with the use of fluorinated coating materials. Such fluorinated coatings have to be cured at relatively high temperatures, i.e., 250° C. or more. Such high temperatures may easily lead to depolarization of the piezoelectric actuators and are therefore not allowed in the fabrication process of the printhead.

Furthermore, the adhesion of fluorinated polymers to substrates is generally poor. In order to achieve a sufficient permanency of the coating, an appropriate primer should be applied to the substrate before applying the fluorinated resin. This increases the complexity and the costs of the manufacturing process. Fluorinated polymers further require the use of special solvents during the coating process, which also contributes to increased costs.

Since the scratch resistance of fluorinated polymer coatings is generally known to be poor, there is a high risk that the coating is harmed during procedures for cleaning the printheads.

Although fluorinated coatings initially have a relatively large wetting angle, it has been found that the wetting angle decreases with time, which is probably due to swelling and/or dissolution of the coating. This effect is particularly undesirable from the viewpoint of constant jet behavior of the printhead.

SUMMARY OF THE INVENTION

It is an object of the present invention to provide an improved anti-wetting coating for hot-melt ink-jet printheads.

According to the invention, this object is achieved by providing an ink-jet printhead adapted for printing with hot-melt ink and having a nozzle face provided with an anti-wetting coating, wherein the anti-wetting coating contains silicone and/or polysilane as main component(s) and has a wetting angle of at least 40° and shows a decrease of the wetting angle of not more than 5% per 100 days of exposure in hot-melt ink.

BRIEF DESCRIPTION OF THE DRAWINGS

Preferred embodiments of the invention will now be described in conjunction with the accompanying drawings, in which.

DETAILED DESCRIPTION OF THE INVENTION

It has been found that certain silanes and silicones, e.g. poly-organosiloxanes, have superior properties when employed as an anti-wetting coating in conjunction with hot-melt inks. In particular, these materials show a surprisingly good ink repellent behavior in relation to most commonly used hot-melt inks. Though the wetting angle of silicone resin may be not as high as the initial wetting angles of fluorinated polymers, these silicon-based coatings are well suitable as anti-wetting coatings. In particular, the wetting angle of these coatings is essentially constant in time and shows much less long-term degradation than fluorinated coatings. This is highly advantageous for reliably assuring a stable performance of the printhead. The coatings employed according to the invention have also been found to have a satisfactory chemical stability in relation to the inks and a sufficient thermal stability in the projected temperature range from about 100 to 150° C. Moreover, these coatings have the advantage that they can be applied directly onto the substrate, i.e., the nozzle face of the printhead, with readily available coating techniques such as spray coating or plasma coating. The use of a primer is not necessary. Thus, the printhead according to the invention can be manufactured in high quality and at comparatively low costs. Yet another advantage, compared to fluorinated coatings, is the hardness of the coating, which leads to improved resistance of the coating against scratching or rubbing.

It is essential that the anti-wetting coating is deposited only on the nozzle face of the printhead but not on the internal walls of the nozzle orifices, in order to avoid an adverse effect on the droplet formation. In one embodiment of the manufacturing process according to the invention, this requirement is fulfilled by clogging the nozzle orifices with solidified ink prior to the coating process. The plugs of solidified ink and the coating material which may have been deposited thereon will automatically be removed when the printhead is heated to its operating temperature and is used for the first time. In a modified embodiment, the nozzle orifices are kept open during a spray-coating process by means of an air flow which is led through the nozzles in a direction opposite to the spraying direction.

Figure 1:
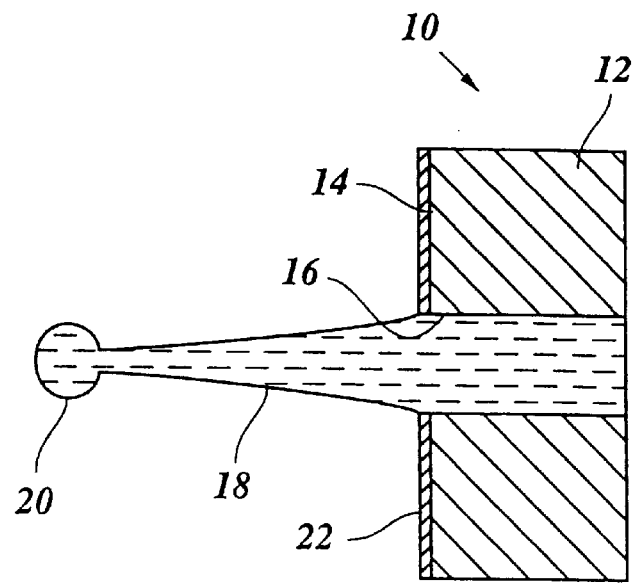
FIG. 1 is a cross-sectional view of a nozzle portion of a printhead according to the invention.

As is shown in FIG. 1, the printhead 10 comprises a substrate 12 which has a nozzle face 14. A plurality of nozzle orifices 16, only one of which is shown in longitudinal section in FIG. 1, are formed in the nozzle face 14. A jet 18 of molten hot-melt ink is expelled from the nozzle orifice 16 to form an ink droplet 20.

As is generally known in the art, the printhead 10 comprises heating means and piezoelectric atuators which are both not shown in the drawing. In operation, the heating means serve to keep the printhead at a temperature above the melting point of the hot-melt ink, so that the ink is maintained in the liquid state. The piezoelectric atuators, are arranged upstream of each nozzle orifice 16 and are energized by respective drop demand signals so that the pressure of the ink liquid is increased and the ink is jetted-out through the nozzle orifice 16.

The nozzle face 14 is formed with an anti-wetting coating 22 on the outer surface thereof which prevents the nozzle face, in particular in the area around each nozzle orifice 16, from being wetted with liquid ink.

The substrate 12 may be made of brass (e.g. 35% Zn/65% Cu), aluminum or any other metal or else of a ceramic material. The anti-wetting coating 22 is formed by a layer which is deposited directly on the substrate and is mainly composed of a silicone resin and/or silane which has a large wetting angle in relation to hot-melt inks and is stable when exposed to these inks, so that wetting of the nozzle face 14 with ink can reliably be prevented during long-term use of the printhead. As a result, the jet 18 is expelled from the nozzle face 14 at right angles without being deflected by remnants of liquid wetting the nozzle face or by attractive forces between the meniscus of the liquid jet and the surface of the nozzle face. Thus, the ink droplet 20 can be deposited on a printing medium with high positional accuracy. The anti-wetting coating has a layer thickness between 10 nm and 10 $\mu$m and preferably between 30 nm and 3 $\mu$m.

It is important that the anti-wetting coating 22 is provided only on the nozzle face 14 but not on the internal walls of the nozzle orifices 16.

Figure 2:
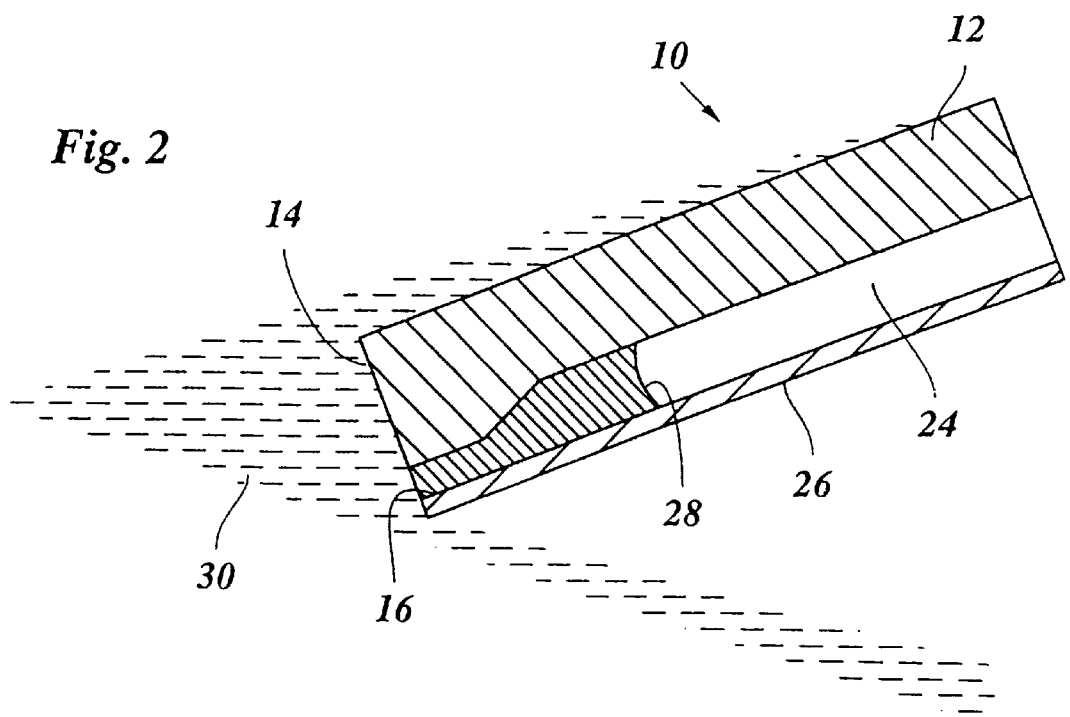
FIG. 2 is a diagram illustrating a manufacturing process for the printhead according to FIG. 1.

FIG. 2 illustrates a first embodiment of a process for manufacturing the printhead 10 according to the invention.

The substrate 12 is provided with a plurality of parallel grooves 24 in the lower surface thereof. Each groove 24 defines an ink channel which is tapered towards the nozzle orifice 16 in the nozzle face 14. The grooves 24 and the nozzle orifices 16 are closed by a bottom plate 26 which may consist of the same material (brass) as the substrate 12 and is firmly fixed to the substrate. The printhead 10 is heated above the melting point of the hot-melt ink, and ink is supplied into each of the grooves 24. Then, the ink is allowed to solidify in the grooves 24, so that each nozzle orifice 16 is clogged with a plug 28 of solid ink.

A coating solution is prepared by dissolving 2.5 wt. % of MK-dimethyl-silicone resin (supplied by Wacker Chemie GmbH, Germany) in a mixture of tetrahydrofurane and n-propanol. A ratio of tetrahydrofurane to n-propanol between 1:1 and 10:1, preferably near 5:1, is suitable for obtaining a smooth coating surface. Also, 1 wt. % (relative to the silicone resin) of tinoctoate may be added to the solution as a catalyst.

The ink is heated to a temperature just above its melting point.

The coating solution is then sprayed onto the nozzle face 14 by means of a conventional spray coating process. As is shown in FIG. 2, the printhead 10 is held slightly inclined relative to the axis of the pencil 30 of sprayed coating solution, so that the coating solution is deposited on the nozzle face 14 and to a smaller extent on the top surface of the substrate 12. The plug 28 of ink prevents the coating solution from penetrating into the nozzle orifice 16.

The coating is cured for 24 hours at a temperature is of 80° C. Then, the printhead 10 is ready for use. The plug 28 of ink is automatically removed when the printhead is heated to its operating temperature and is used for the first time.

In a second embodiment, a poly-methyl-methoxysiloxane (silicone resin MSE-100 from Wacker Chemie GmbH, Germany) is used for preparing the coating solution. Approximately 1 g of MSE-100 is dissolved in 100 ml of a mixture of tetrahydrofurane/xylene (4:1). About 5% by weight polybutyl-titanate is added as a catalyst. A coated layer with a thickness of about 2 $\mu$m is obtained by means of a spray coating process. In this case, the nozzles can be kept open by means of an air flow which is supplied into the ink channels so that the air leaves through the nozzle orifices in a direction opposite to the spraying direction. The coated printhead is cured for three hours at 100° C.

In yet another embodiment, the anti-wetting coating 22 is formed by a plasma-coating process. In this case, the coating material, preferably a silane compound or a mixture of various silane compounds, is evaporated, and a polymerization reaction in the gas phase is induced by applying a high-frequency electric field to the vapor in the vicinity of the substrate to be coated, so that atoms, ions and radicals present in the gas plasma react with the surface of the substrate and form the desired coating layer. In this case, the coating layer preferably has a thickness of only about 0.3 µm.

Of course, the anti-wetting coating according to the invention may also be applied by other processes, such as dip coating or the like.

Particularly preferred coating compositions comprise:
(a) MK-dimethyl-silicone resin (coating solution prepared as described above);
(b) silicone resin MSE-100 (coating solution prepared as described above);
(c) silicone resin 50E (supplied by Wacker Chemie GmbH, Germany);
(d) 3-aminopropyl-triethoxysilane (a suitable coating solution is obtained by dissolving 4 wt. % of this compound in toluene); (e) silicone resin (a) with n-2-aminoethyl-3-aminopropyltrimethoxysilane added thereto in an amount of 10 wt. % (based on the silicon content).

These coating compositions are preferably used in conjunction with the following three commonly used types of hot-melt ink:

I. n-methyl-p-toluenesulfonamide
II. bisurethane (reaction product of methylethyleneglycol and hexamethylene-diisocyanate)
III. 1,2-hexadecandiol.

Figure 3:
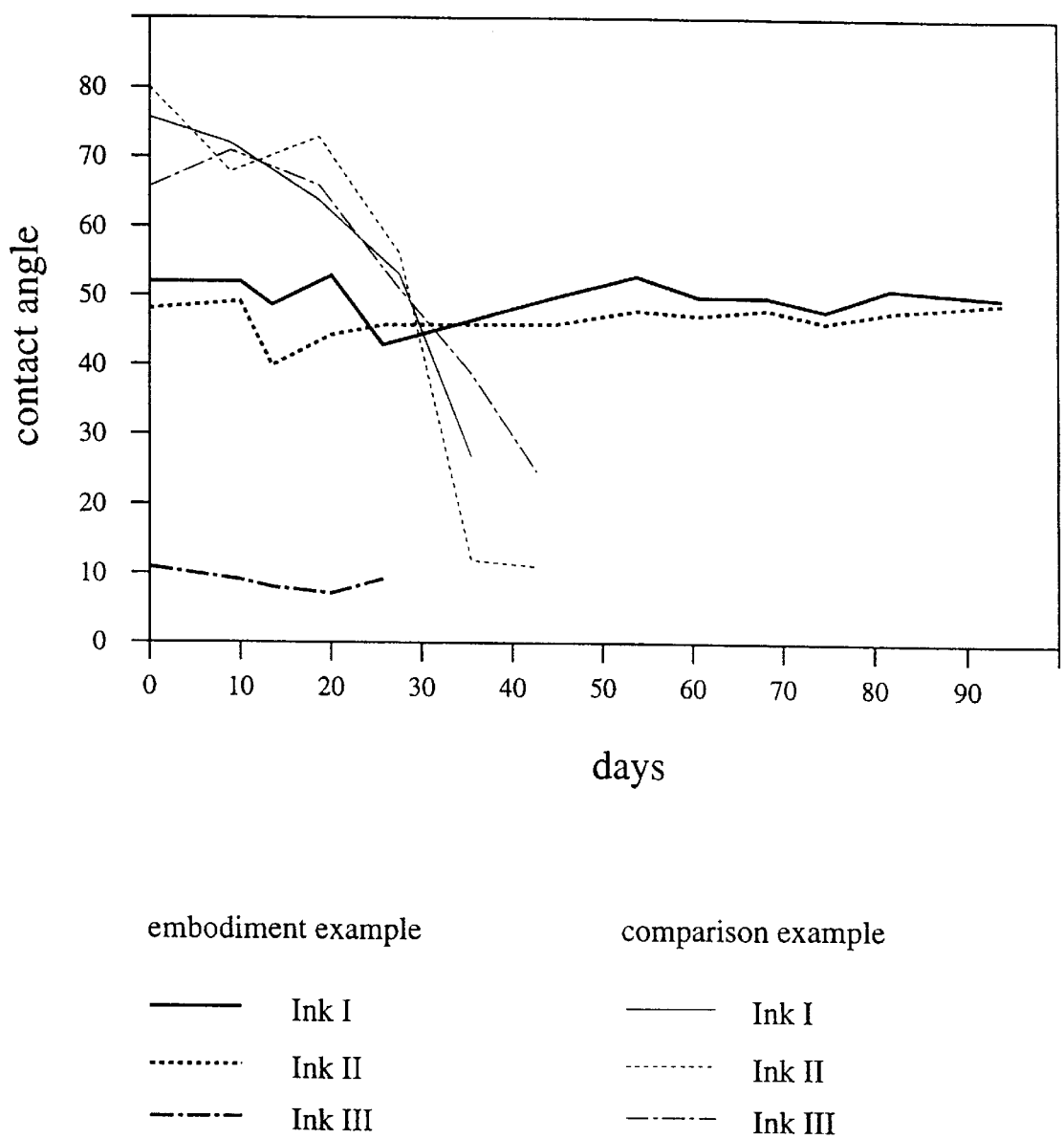
FIG. 3 is a diagram illustrating the time changes of the wetting angles of an anti-wetting coating according to the invention and according to a comparison example when exposed to different types of hot-melt ink.

FIG. 3 shows the results of measurements of the wetting angle for an anti-wetting coating based on silicone resin MSE-100 in accordance with the above-described second embodiment of the invention. The wetting angle has been measured not only for the fresh coating but also after exposure of the coating in each of the three above-mentioned hot-melt inks for up to 90 days. For comparison purposes, the wetting angles of a conventional fluorinated coating (Dupont AF 2400) as described in EP-A-0 359 365 has been measured under the same conditions. It will be appreciated that the wetting angle of the coating according to the invention remains essentially constant, whereas the conventional coating shows a considerable decrease of the wetting angle after several days of exposure.

Similar results are obtained for coatings based on MK dimethyl silicone resin or silicone resin 50E. The last mentioned resin has a comparatively large and essentially constant wetting angle around 30° in hexadecandiol.

While specific embodiments of the invention have been described, it will occur to a person skilled in the art that these examples can be modified in various ways without departing from the scope of the invention as defined in the appended claims.

What is claimed is:

1. A hot-melt ink, ink-jet printhead having an outer nozzle face provided with an anti-wetting coating, and nozzle orifices opening on the nozzle face; wherein the anti-wetting coating contains a member selected from the group consisting of silicone and polysilane and mixtures thereof, as main component(s) and has a wetting angle of at least 40° and shows a decrease of the wetting angle of not more than 5% per 100 days of exposure in hot-melt ink.

2. The printhead according to claim 1, wherein the anti-wetting coating contains a poly-organosiloxane.

3. The printhead according to claim 2, wherein the anti-wetting coating contains poly-methyl-methoxysiloxane.

4. The printhead according to claim 1, wherein the anti-wetting coating contains a dimethyl-silicone resin.

5. The printhead according to claim 1, wherein the anti-wetting coating contains n-2-aminoethyl-3-aminopropyltrimethoxysilane.

6. The printhead according to claim 1, wherein the anti-wetting coating contains 3-aminopropyl-triethoxy-silane.

7. The printhead according to claim 1, wherein the printhead is manufactured by a process comprising the steps of:
applying the anti-wetting coating composition to the nozzle face of the printhead by spray coating, and
passing a stream of gas through the nozzle orifices in a direction opposite to the spraying direction.

8. The printhead according to claim 7, wherein the anti-wetting coating composition is applied to the nozzle face of the printhead by plasma coating utilizing a vapor phase of the silane compounds.

9. The printhead according to claim 1, wherein the printhead is manufactured by a process comprising the steps of:
clogging the nozzle orifices of the printhead with ink,
applying the anti-wetting coating to the nozzle face of the printhead, and
removing the ink from the nozzle orifices.

10. A printing system, comprising:
(a) a hot-melt ink, ink-jet printhead having an outer nozzle face provided with an anti-wetting coating, and nozzle orifices opening on the outer nozzle face; wherein the anti-wetting coating contains a member selected from the group consisting of silicone and polysilane and mixtures thereof as main component(s) and has a wetting angle of at least 40° and shows a decrease of the wetting angle of not more than 5% per 100 days of exposure in a hot-melt ink; and
(b) a hot-melt ink containing n-methyl-p-toluenesulfonamide, 1,2-hexadecandiol or bisurethane.

11. The printhead according to claim 9, wherein said hot-melt ink contains n-methyl-p-tolueenesulfonamide, 1,2-hexadecandiol or bisurethane.

* * * * *